Sept. 20, 1927. 1,642,960
P. M. KRANTZ
AUTOMOTIVE EQUIPMENT
Filed Dec. 13, 1926 2 Sheets-Sheet 1
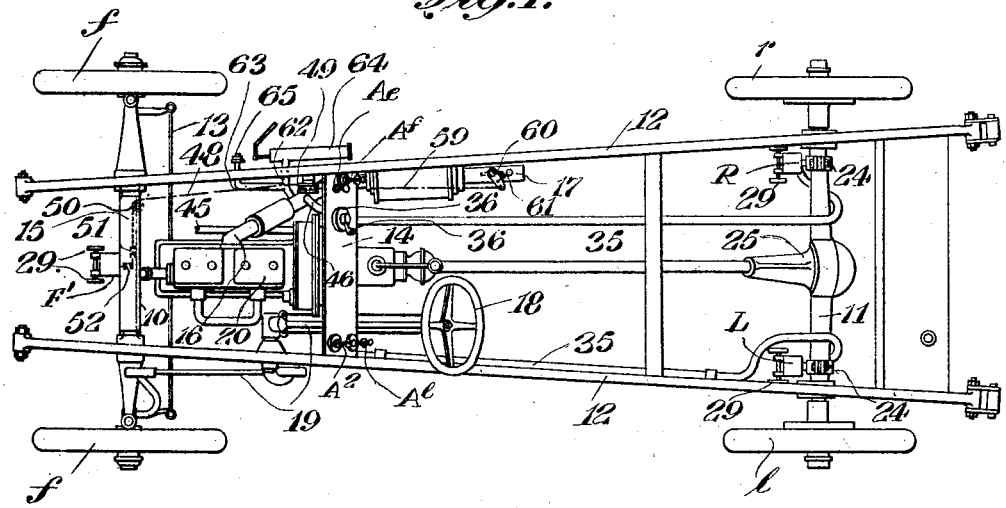
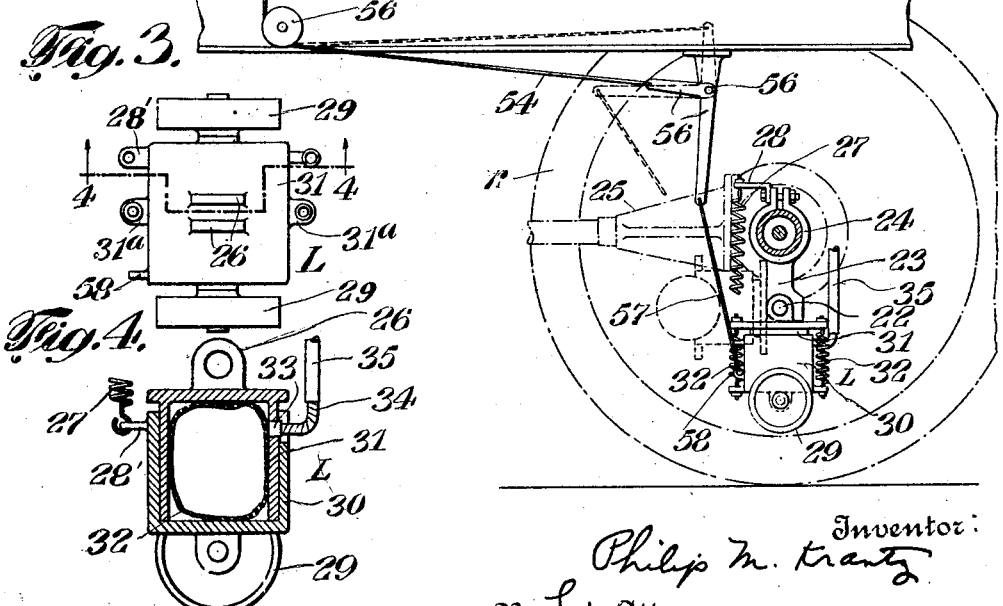
Inventor:
Philip M. Krantz
By his Attorney
Augustus M. Henry Sept. 20, 1927.
P. M. KRANTZ
1,642,960
AUTOMOTIVE EQUIPMENT
Filed Dec. 13, 1926     2 Sheets-Sheet 2
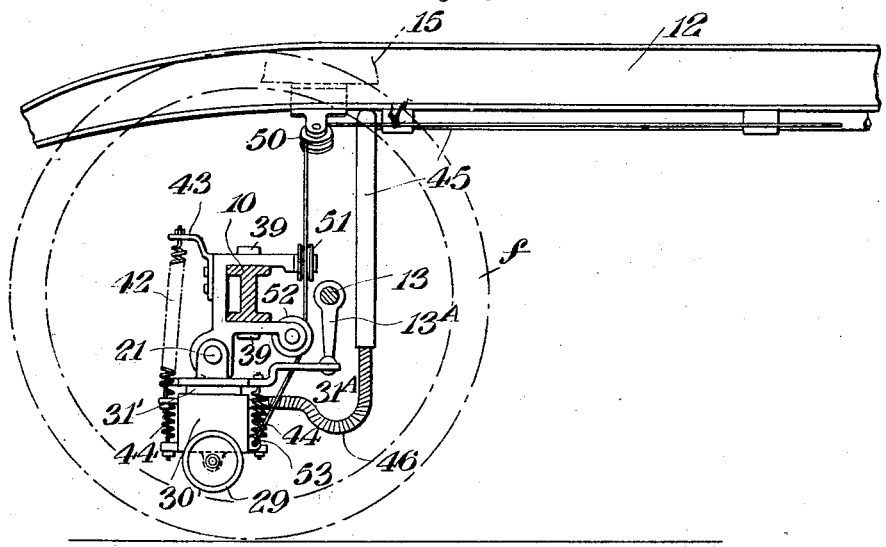
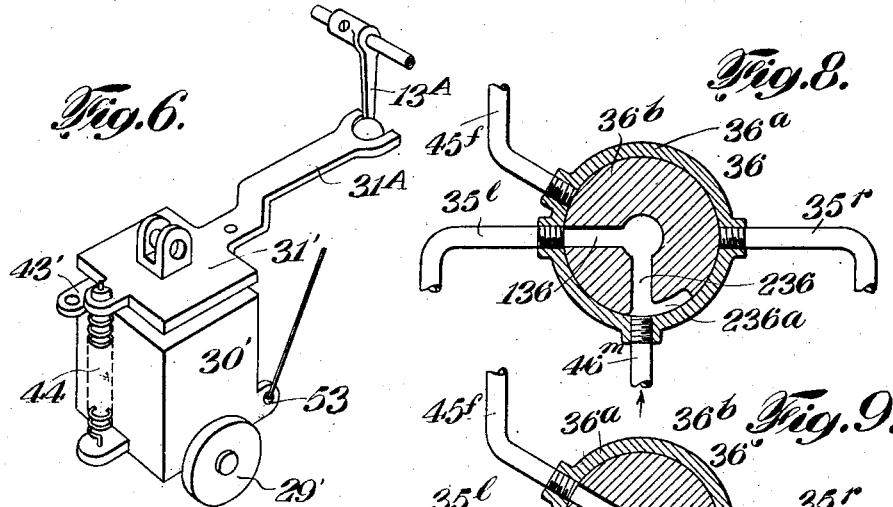

Patented Sept. 20, 1927.

1,642,960

UNITED STATES PATENT OFFICE.

PHILIP M. KRANTZ, OF BROOKLYN, NEW YORK.

AUTOMOTIVE EQUIPMENT.

Application filed December 13, 1926. Serial No. 154,502.

The subject of this invention is a new and useful equipment, preferably one attachable to, when not inbuilt in, an automotive vehicle; such equipment then to be employed for easily abnormally elevating a particular portion or portions of the vehicle.

Such temporary elevation has for its purpose to facilitate rolling movement of the vehicle, as for travel, particularly is emergencies, or steering while in rolling travel, in emergencies or "tight" places; the invention further having in mind, preferably, an equipment also so constructed and operable as to afford, when desired, tire-inflation means, and/or anti-theft means, utilizing products of combustion from the motor or engine.

One of the objects of the invention is to provide means for jacking up any desired wheel of the vehicle by pneumatic power.

Another object is to provide means for selectively pneumatically jacking a desired plurality of the wheels, at front and rear ends of the vehicle, say wheels the tires of which have unexpectedly collapsed into "flats", while keeping nevertheless one of the rear or tractive wheels in road contact.

Another object is to provide the aforesaid jack means so that they may be actuated by engine-exhaust-gas handling, to elevate or lower a desired wheel, and preferably from the driver's seat; thereby to facilitate tire-changing.

Another object is to provide the aforesaid jack-means so that they may be actuated by engine-exhaust-gas handling, to elevate or lower a desired wheel, and preferably from the driver's seat, thereupon to permit rolling travel of the vehicle, partly on its non-"flat" tire or tires and partly on wheel-means on a jack or jacks, and under power from the vehicle's engine, say to a handy garage, for tire repair or the like.

Another object is to provide the aforesaid jack-means so that they may be actuated by engine-exhaust-gas handling, to elevate or lower a desired wheel, and preferably from the driver's seat, preparatory to leaving the vehicle for a time unattended; thereby to dispose the vehicle in an abnormal condition and one such that travel of the vehicle by an unauthorized occupant will be made slow and difficult, if possible at all, since such travel may be notice to a police officer to call on the occupant to show his credentials of ownership, or right to be operating the automotive vehicle.

Another object is to provide the aforesaid jack-means so that they may be actuated by engine-exhaust-gas handling, to elevate or lower a desired wheel, and preferably from the driver's seat, and so that then pneumatic means, preferably also including the engine-exhaust, may be employed to re-inflate a deflated tire or tires.

Another object is to provide the aforesaid jack-means so that they may be actuated by engine-exhaust-gas handling, to elevate or lower a desired wheel, and preferably from the driver's seat; yet an equipment such that, when engine trouble is such as to prevent said engine-exhaust-gas handling, said jack-means may be operated to elevate a flat tire or tires, and then said tire or tires may be reinflated, and then said jack-means may be operated to lower the reinflated tire or tires to road contact, independent of exhaust-gas supply by the engine.

Another object is to provide the aforesaid jack-means so that they may be actuated by engine-exhaust-gas handling, to elevate or lower a desired wheel, and preferably from the driver's seat, and so that then said jack-means may be adjusted variously and at intervals, and from the driver's seat, if both front-wheels have been elevated, to steer the car while being rolled, under its own power or otherwise, to the nearest garage.

I am aware it has heretofore been suggested, in attempts to solve some of the above indicated occasionally encountered yet annoying and sometimes serious problems of the motorist, to employ roller-equipped jacks, and even to mount these jacks on horizontal pivots, as I recommend in the case of the present invention, for normally holding the jacks extended parallel to the wheel-base, that is, at right angles to their working-extensions. I am also aware that it has heretofore been suggested that engine power be used, as by a take-off gear from the propeller-shaft, or from an element of the variable-transmission gear-set, thus mechanically to operate a jack for wheel-elevation; and, further, that fluid-pressure means (as for instance, in U. S. Patent No. 1,161,706) have been mechanically driven from the engine, as from a part turning with it, said fluid-pressure means in turn being intended to operate a jack by fluid-pressure action.

The present invention, as contrasted with schemes such as those referred to in the sentence immediately preceding, proposes a jack-operating means of the fluid-pressure type which is characterized by expansion of a compressed fluid directly to cause a roller-carrying jack-part to exert wheel-lifting pressure against the road, which fluid is preferably the same fluid that normally leaves the muffler or muffler cut-out as the product of combustion of the engine.

Thereby, the present invention obtains the practical advantages of attaining the various objects in mind, including those already mentioned, by the use of an automotive equipment new and valuable in that, while always reliable in operation, it may be inexpensively constructed, attached (or inbuilt), and serviced; it may, in engine-stoppage emergency be fairly easily hand operated; it may be simply and ruggedly put together; and it may be inconspicuously carried by the vehicle in out-of-action location.

Various other objects and advantages of the invention will be specifically pointed out or apparent hereinafter, in the course of a description of a preferred one of the various possible forms of the invention as shown in the accompanying drawings, it being understood, of course, that such form is merely illustrative of one combination and arrangement of parts calculated to attain the objects of the invention, pursuant to present preference, and hence the detailed description of such form now to be given is not to be taken as at all limiting the invention itself, except as necessitated by the scope of the claims. That is to say, the scope of protection contemplated is to be taken solely from the appended claims, interpreted as broadly as is consistent with the prior art.

In the accompanying drawings:

Fig. 1 shows in top plan a light-type or passenger-vehicle chassis carrying an illustrative embodiment as an attached or "accessory" feature and with three jack-devices shown all retracted or swung up parallel to the road-bed;

Fig. 2 is an enlarged side elevation of the rear left jack-device and certain operative connections to the driver's station; and showing also, in section, the rear axle of the vehicle and its contained drive-shaft, in dot-and-dash lines the propeller shaft-tube and differential, and in broken lines the jack-device when retracted as in Fig. 1;

Fig. 3 is a top plan view, further enlarged, of the jack-device of Fig. 2 as shown there in full lines;

Fig. 4 is a vertical section, taken on line 4—4 of Fig. 3;

Fig. 5 is a view similar to Fig. 2, but showing the front-axle jack-device;

Fig. 6 is an enlarged perspective of the jack-device as shown in Fig. 5;

Fig. 7 is a central vertical fore-and-aft section of the jack-device last-mentioned, showing the upper portion of the same;

Fig. 8 is a trans-axial section through the single-valve jack-inflation control preferably employed at the driver's station; and Fig. 9 is the same as Fig. 8 except that the valve-rotor or member has a different angular adjustment within the valve-casing than as shown in Fig. 8.

Similar reference characters refer to similar parts throughout the several views of the drawings.

In its at present recommended form the invention, as illustratively but not delimitively embodied in these drawings, and with component elements supported by or attached to a vehicle's front axle 10, rear axle 11, chassis side-frame members 12, front-wheel-steering cross-rod 13, dash-board 14, motor-supporting cross-piece 15, exhaust-manifold discharge conduit 16, and muffler discharge-pipe 17, is adapted to serve at will in elevation one or more of the two front wheels, $f$, the right rear wheel $r$ and the left rear wheel $l$, and, when desired permit the usual hand-wheel 18 and connections 19 to be used in steering the vehicle with both front-wheels elevated, and even to permit the vehicle to roll along under the power of its own engine 20 in every case except where both rear wheels have "flats" such that both rear wheels must be elevated.

The capabilities just stated follow despite the fact, that merely three jack-devices are illustrated, to wit, a front jack-device F' and two rear jack-devices R and L, these devices being hereinafter called the jacks, and despite the fact that the jack F', at about the middle of the front axle 10, is pivotally mounted on a horizontal pintle 21 (Fig. 5), just as the rear jacks R and L, are pivotally mounted on horizontal pintles near the opposite ends of the rear axle 11.

As shown in the case of the rear jack L at 22 in Fig. 2, each of these pintles of the two rear jacks passes through the knee portion of an L-leg 23 dependent from a split-collar bracket 24 bolted about the rear axle at points rather considerably removed from the differential 25. As further shown in the case of the jack of Fig. 2, each pintle 22 passes also through ears 26 at the top of its associated jack: thus mounting such jack so that normally, a retractile spring 27, stretched between L-strip 28 and a lug on the jack as best shown at 28' in Fig. 4, maintains the jack and its rollers or wheels 29 normally retracted to a line of horizontal extension as shown in Fig. 1 and as indicated in dot and dash lines in Fig. 2.

As illustrated in Figs. 2 and 3, each rear jack includes a pair of telescoping sections, a lower section 30 suspending the wheels 29 and slidingly receiving an upper section 31. Normally, due to a pair of retractile springs shown at 32 in Fig. 2 and at their bottoms secured to lugs on the section 30 and at their tops to lugs on the section 31 marked 31$^a$ in Fig. 3, the jack is collapsed as shown in Fig. 4. Within the chamber formed between the jack sections, which chamber is preferably always closed all over by a metal or other difficultly puncturable wall, is a rubber or other suitable inflatable bag 32, the interior of which is in communication at all times through a nipple 33, with a metal-armored flexible tube 34 connected to a metal fluid-conduit 35 leading to a control valve indicated at 36 in Fig. 1. Said conduit terminates at said valve, as indicated in Figs. 8 and 9 at 35$^r$ or 35$^l$, according as the jack is at the rear right or rear left of the vehicle.

Referring now to the front jack F, the pintle 21 passes through a foot 37 dependent from a C-casting 38 secured at 39, 39 to front axle 10, this pintle also passing through a pair of ears 40 at the top of the jack. Jack F also includes telescoping sections, here marked respectively 30' and 31'. Ears 40 are integral with a vertical pintle, or jack-steering post, 41, rotatably set in the top plate of upper section 31'. This jack is preferably constructed, as to the chamber between the two sections and as to their contents and the connection to said chamber, as are the jacks already described; except that a protector disc 42 is inserted above the inflatable bag 32'. Normally, the jack, like the rear jacks L and R, is held swung upwardly and forwardly of the pintle 21, to displace the centers of the wheels 29 through 90° in a clockwise direction, from the location shown; due to the action of a retractile spring 42 attached at its upper end to a bracket-auxiliary 43 and at its lower end to a lug 43' on lower section 30'. Also normally, due to a pair of retractile springs 44 mounted as shown, the jack F is collapsed as indicated in Figs. 5, 6 and 7.

As shown in the case of the rear jack of Fig. 4, the interior of the inflatable bag within the front jack F is in communication at all times, by way of a flexible shaft 46, with a metal fluid-conduit 45, leading to the control valve 36 of Fig. 1 and to the interior of the valve casing 36$^a$ as indicated at 45$^f$ in Figs. 8 and 9. The fourth tap into the interior of said valve casing 36$^a$ is that indicated at 46$^m$, which latter is a continuation of the conduit shown at 46 in Fig. 1 as constituting a branch from motor-exhaust pipe 16.

Referring to Fig. 1, there are also here provided, in the present case also on the dashboard 14, four manual actuators as indicated at A$^e$, A$^f$, A$^r$ and A$^l$. Such details of construction of each of these actuators as is necessary to be here shown are indicated in Fig. 2, where the actuator A$^l$ is illustrated. Each of the actuators A$^f$, A$^r$ and A$^l$, is thus indicated as desirably being of the well known type whereof an outer sleeve plunger A$^2$ is so associated with an inner rod-plunger A$^3$, that on pulling with the fingers on the underside of a flange V all the parts contained within a mounting and guide collar 47 may be moved in the direction indicated by the arrow $v$ to actuate the proper operative connection to swing the associated jack down to vertical extension below the proper axle of the vehicle; while pressing down on the button H (such pressure releasing the ratchet device which has allowed the sleeve-plunger A$^2$ only to be moved upwardly as just described, without slip-back whenever released), permits all the parts slidable in collar 47 now to slip-back, that is, to move in the direction indicated by the arrow $h$, to normal position, thereby to allow restoration of the jack to horizontal position close up under the proper axle, responsive to the retractile spring 27 (Fig. 2) or 42 (Fig. 5).

Referring now to the operative connections between these actuators and the jacks, the connection from the front jack F to its actuator A$^f$ on the dash-board 14, includes a cable 48, running from the lower end of the sleeve-plunger of the actuator, over pulley (Fig. 1) and pulleys 50, 51 and 52 (Figs. 1 and 5) to an ear carried by the front jack F as indicated at 53 (Figs. 5 and 6). The connections from the rear left jack L to its actuator A$^l$ on the dash-board 14, includes, as shown in Fig. 2, a cable 54 running from the actuator, over a pulley 55, to the shorter arm of a bell-crank lever 56, pivoted at 56$^a$; and a rod 57 pivoted at its upper end to the longer arm of the bell-crank lever and at its lower end to an ear 58 on the jack. Finally, as to the rear right jack R, there is employed an operative connection from the actuator A$^r$, including a rod, lever, and cable (not shown) similar to the rod 57, lever 56 and cable 54, and one or more pulleys (not shown) for guiding the cable. Such pulleys may be in different planes if necessary; for instance, like the pulleys guiding the cable 45 as shown in Figs. 1, 5 and 6.

The actuator A$^e$, also, may be exactly similar to the other actuators already described; in which case a cable shown at 59 in Fig. 1 may be pulled toward the front of the vehicle or payed out toward the rear of the vehicle, according as the actuator is pulled toward or allowed to recede away from the driver of the vehicle and thus operated according to the intended method of operation of this type of actuator as already described. The actuator A$^e$ thus may be employed to closing or opening the exhaust pipe 17; by opening a valve 60 against a spring 61, on pulling the cable 59 forward, and permitting said spring to close said valve, on paying out the cable in a rearward direction.

The present invention may also incorporate dirigibility of the front jack F, from the steering wheel 18, when that jack has been disposed and operated to lift the front wheels $f$ off the roadway, and the car is in movement; and to this end the following parts are shown in Figs. 1, 5 and 6: The top plate of section 31′ of the jack is rearwardly extended as an arm 31$^a$ having a fork at its rear end. On the cross-rod 13 is a collar 13$^a$ having a depending arm terminating at its lower end in a ball. This fork-and-ball pivotal connection permits the connection to be automatically broken when front jack F is swung up horizontal to normally retracted position, and permits the connection to be easily restored when the jack is lowered to vertical or working position. During the maintenance of said pivotal connection, obviously, turning of the steering wheel will steer the vehicle, by way of the wheels 29 of the front jack, exactly as the steering wheel is automatically used to steer the vehicle by way of the front vehicle wheels $f$.

Referring to Fig. 1, the pipe 16 from the exhaust manifold is provided with branches 62 and 63; one leading to a pump which, as indicated at 64, may be a familiar type of hand actuated plunger pump, and the other leading to a valve which, as indicated at 65, may be the familiar type of nipple valve such as employed in attaching a compressed air hose to a garage compressor or as is carried by a tire to permit the discharge end of such a hose to be applied to inflate a tire.

Referring to Figs. 8 and 9, the valve 36 shown as a single rotatable plug-member 36$^b$ having an angular passage therethrough including legs 136 and 236, the leg 236 being L-shaped to provide a vestibule 236$^a$.

*Operation.*

If either front vehicle wheel is to be relieved of the vehicle load, say for a road repair or for travel to the nearest garage, the entire front axle is lifted by the jack F, as even if the vehicle is thus to travel, it may be steered from the wheel 18 as already explained.

If, however, it is a rear vehicle wheel which is to be elevated, only the jack R or L adjacent to that wheel is employed; so as to leave at least one rear wheel in road contact for traction. No matter which wheel or wheels are to be thus elevated by employing a jack or a plurality of jacks, the operator always must employ the actuator A$^e$, to close the valve 60 in the muffler discharge pipe 17, thereby to shut the various conduit and conduit branches against communication with the atmosphere, preparatory to causing a jack to start elevating, or even to utilizing the valve 36 as hereinafter described; and the operator also must always employ actuator A$^e$, to open the valve 60 in the pipe 17, thereby to open the various conduits and conduit branches to the atmosphere preparatory to releasing the fluid pressure in a jack or jacks, as when the tire trouble has been remedied.

When a front tire trouble is to be attended to, the engine is started running or kept running, but the clutch is maintained out or is thrown out. Next, the operator employs actuator A$^e$ to close valve 60, and then employs actuator A$^f$ to swing the jack F down to vertical position under front axle 10. Next, he turns the control valve handle, shown at 36$^b$ in Fig. 1, to the proper index (not shown), thereby arranging the valve parts as shown in Fig. 9. Thereupon, the exhaust gases are admitted into the inflatable bag within the front jack; and the jack is permitted to expand until the front vehicle wheels $f$ are raised say a couple of inches above the roadway. When that condition is attained, valve member 36$^b$ is moved in the direction of the arrow in Fig. 9 through about the angle C$^f$, which thereupon closes the valve 36 to the bag in the front jack. And now the front jack will hold the front vehicle wheels elevated as last stated, as long as desired; so that the engine may be shut off, or, if it is desired to steer the car during rolling travel from one point to another, actuator A$^e$ may be employed to open valve 60 in discharge pipe 16 and the engine left running, the clutch thrown in and the gear shift actuated as usual, and steering accomplished through wheel 18 and the fork-and-ball joint shown in Fig. 6.

In the same way, when a rear tire is to be repaired, the rear jack R or L is lowered to vertical or working position by means of actuator A$^r$ or A$^e$. Then, the valve handle 36$^h$ is turned and the valve member 36$^b$ is arranged as shown in Fig. 8, if it is jack L which is to have its inflatable bag expanded, or such handle is turned until the vestibule 236$^a$ is opposite the conduit 35$^r$ and the leg 136 is opposite the conduit 46$^m$, if it is jack R which is to have its bag expanded. And the pressure of the said bag, once it has built up to that desired, may be held as long as required by slightly shifting the valve member, this time in a direction opposite to that of the arrow shown in Fig. 9, but through about the same angle as that indicated at C$^f$ in Fig. 9, whether it is the jack R or the jack L which is being served in this case. Here, also, actuator A^e is employed to open the valve 60 in the discharge pipe 17 as soon as the valve member 36^b has been moved to break communication between conduits 46^m and 46^l or 46^r.

From the foregoing two paragraphs, it will be seen that, according to the construction illustrated, even though a single valve 36 is employed, any one or more of the jacks F, R and L may have its bag inflated as desired, and that any one or more of these bags may be held against deflation as much as desired, and that, also, any one or all of the inflated bags may be deflated without inflating another, and a plurality of the bags, inflated, may be deflated in turn, by first opening the valve 60 in discharge pipe 17 and then properly manipulating the valve handle 36^b.

If the driver of the vehicle desires only to employ a jack or jacks to lift a wheel or wheels carrying the damaged tire or tires, so that during such elevation he himself may repair the damaged tire or tires, or even if he desires to inflate further a not highly enough expanded tire, so that previous use of a jack or jacks is not required, the exhaust gases from the engine may be used for all these purposes. In that case, the operator has merely to apply at 65 a hose of the kind already referred to, and then, as he applies this hose to a tire to be inflated or further inflated, he has only to employ the actuator A^e to close the valve 60 in discharge pipe 17 during such application of the hose. As a result, these gases, instead of passing out through the muffler and the discharge pipe 17, pass from conduit 16 to branch conduit 62 and thence through branch conduit 63 to the outlet 65 to the hose.

I recommend the foregoing tire inflation means and method, over any previously suggested, such for instance, as the arrangements now employed in Cadillac and other automobiles, wherein a compressor is driven or adapted to be driven from the motor, as by a gear train connecting the compressor and say the second speed shaft of the variable speed transmission. Such a compressor is expensive to install and maintain in service and is useless in the event of engine trouble.

In the case of the present invention, if the engine should fail, branch conduits 62 and 63, once the actuator A^e has been employed to close the valve 60 in discharge pipe 17, will also serve to permit the pump 64 to be operated to inflate the bag within a desired jack, or to inflate or further inflate a tire, or for both purposes. If the pump 64 is operated relative to a jack bag, that bag is inflated, held against deflation, and deflated by operating the valve 36 as already described. If the pump 64 is to be operated to inflate or further inflate a tire, the valve 36 is set to shut off the conduit 46 from communication with any of the conduits 35 and 46, and the same hose already referred to is connected at 65.

It will be noted that I have illustrated and described in great detail a particular embodiment of the invention, of the many possible embodiments, and one well calculated to attain all the various ends and objects hereinafter set forth or indicated; but inasmuch as many changes could be made in the above constructions, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. An equipment for automotive vehicles for facilitating tire handling, including the combination of a jack including a plurality of relatively movable sections having a chamber therebetween and adapted to be given relative movement by fluid pressure in said chamber; means for mounting said jack on the vehicle in position to elevate a desired vehicle wheel by such relative movement; a source of air under pressure, means for confining exhaust gases from the engine; a fluid conveying means; means for selectively delivering fluid from said source or from said confining means, to said conveying means; and means for selectively delivering fluid from said conveying means, either to said chamber or to a tire interior.

2. An equipment for an automotive vehicle having an internal combustion engine, comprising, in combination with the conduit for the normal discharge to the atmosphere of the exhaust gases from said engine, a jack having a plurality of relatively movable sections providing a chamber therebetween and adapted to be given relative movement by fluid pressure in said chamber, a fluid pressure conveying line opening at one end into said conduit and opening at its other end into said chamber, a first valve in said line operable to open and close the line relative to the jack, and a second valve in said conduit beyond the point where said line opens into said conduit, the second valve being operable to close said conduit while the first valve is open, thereby to admit exhaust gases from the engine to said chamber while the engine is running, and both valves being adapted to be opened simultaneously thereby to relieve the pressure of the exhaust gases in said chamber.

3. The equipment defined in claim 2, wherein means are provided for operating the second valve from the driver's position.

4. The equipment defined in claim 2, wherein means are provided for operating either valve at will from the driver's position.

5. An equipment for an automotive vehicle having an internal combustion engine, comprising, in combination with the conduit for the normal discharge to the atmosphere of the exhaust gases from said engine, a normally open valve in said conduit to permit said conduit to discharge to the atmosphere during ordinary running of the engine, a plurality of fluid pressure operated jacks, each such jack having a fluid pressure chamber, fluid pressure conveying means opening into said conduit at a point between the engine and said valve, and a normally closed valve means associated with said fluid pressure conveying means, said fluid pressure conveying means including a plurality of connections each leading to a different one of said chambers, and said normally closed valve means being operable relative to any particular one of said connections to make the same effective to open connection between a particular one of said chambers and said conduit, when the normally open valve is closed as well as when the same is open, said normally open valve being adapted to be closed at will.

PHILIP M. KRANTZ.